UNITED STATES PATENT OFFICE.

ALBERT C. WEIMAR, OF GROVE CITY, PENNSYLVANIA.

PROCESS OF EXTRACTING SOLUBLE ALBUMEN FROM WHEY.

1,381,605.     Specification of Letters Patent.    Patented June 14, 1921.

No Drawing.     Application filed March 18, 1920. Serial No. 366,937.

(FILED UNDER THE ACT OF MARCH 3, 1883, 22 STAT. L., 625.)

*To all whom it may concern:*

Be it known that I, ALBERT C. WEIMAR, a citizen of the United States, and an employee of the Department of Agriculture of the United States of America, residing at Grove City, in the county of Mercer, State of Pennsylvania, and whose post-office address is Grove City, Pennsylvania, have invented new and useful Improvements in Processes of Extracting Soluble Albumen from Whey.

This application is made under the act of March 3, 1883, chapter 143 (22 Stat. 625), and the invention herein described and claimed may be used by the Government of the United States or any of its officers or employees in the prosecution of work for the Government, and by any person in the United States without payment to me of any royalty thereon.

The object of my invention is to obtain the lact-albumen of the whey in a soluble form and as free from other milk constituents as possible.

After removing the casein and fat from milk there remains in the milk a certain amount of milk, sugar, albumen and salts. My process of recovering the albumen in a soluble form is as follows: The fat and casein are removed from whey, and if the whey contains more than .15 per cent. acid calculated as lactic acid, the whey is neutralized. The whey is then concentrated at a temperature below the coagulating point (72° C.) of lact-albumen to a concentration at which the greater part of the lactose crystallizes. The evaporation is done most efficiently in a vacuum pan, but it is not essential to the process that a vacuum pan be used. It is essential, however, that the whey be maintained at the proper reaction at all stages of the process to prevent precipitation of the albumen. The crystallized lactose is removed by a filter press of the proper type or by running the mother liquid through a sugar centrifuge. In either case the sugar obtained may be further purified by washing in the filter or centrifuge with a small amount of cold water. The filtrate will still contain a certain amount of lactose which, if desired, may be partially removed by further concentration and a second filtration or centrifugalization. The filtrate still contains, in addition to the albumen, some lactose and all of the salts. The salts and some of the lactose may be removed by passing the filtrate through a continuous dialyzer. This step may be omitted when the whey used is so low in acid that it does not require neutralization. If acid whey, such as is obtained in the manufacture of Cheddar or cottage cheese or casein is used it is necessary to neutralize the acid, thus increasing the salt content to such an extent as to make dialyzing necessary. The resulting concentrated albumen solution contains small quantities of lactose and salts. The remaining water is removed by any method which does not heat the albumen above the coagulating point. This may be accomplished in a tunnel drier such as is used in making casein or the insoluble albumen obtained as a byproduct in the manufacture of lactose; in a drum drier operating in a vacuum chamber; or by spraying the concentrated whey into a current of warm air. The powder so obtained contains all of the albumen, a small amount of milk sugar, and some of the salts of the milk. These constituents are all in soluble form, and can be converted back to their original condition by the addition of water. The resulting product has many of the physical and chemical properties of egg albumen, and can be used in baking in the same way as eggs.

Having thus described my invention, what I claim is:

1. A process of extracting soluble albumen from whey, consisting in neutralizing the acid content of whey, concentrating the whey at a temperature below the precipitating point of the albumen contained therein to a degree at which the greater part of the lactose content of the whey crystallizes, separating the said crystallized lactose from the whey, dialyzing the whey to remove the milk salts and some of the lactose, and finally, removing the remaining water by drying at a temperature below the precipitating point of the albumen, the resulting powder containing the albumen, a small amount of milk sugar, and some of the salts of the milk.

2. A process of extracting soluble albumen from whey, consisting in concentrating the whey at a temperature below the precipitating point of the albumen at a degree at which the greater part of the lactose crystallizes, separating the said crystallized lactose from the whey, and finally, removing the remaining water by drying at a temperature below the precipitating point of the albumen.

ALBERT C. WEIMAR.

Witnesses:
   LOUISE SPEARS,
   C. H. HARSHAM.